United States Patent [19]

Landt et al.

[11] Patent Number: 4,970,479

[45] Date of Patent: Nov. 13, 1990

[54] MULTICOUPLER INCLUDING FREQUENCY SHIFT FILTERS

[75] Inventors: Harvey L. Landt, Cedar Rapids; James A. Irvine, Marion, both of Iowa

[73] Assignee: Rockwell International Corporation, El Segundo, Calif.

[21] Appl. No.: 441,809

[22] Filed: Nov. 27, 1989

[51] Int. Cl.[5] .......................... H01P 1/10; H04B 1/44

[52] U.S. Cl. .................................... 333/101; 333/132; 333/175; 333/202; 333/219; 455/78; 370/38

[58] Field of Search ............... 333/100, 101, 103, 124, 333/129, 132, 24 R, 139, 164, 175, 202, 219; 455/78, 82, 83; 370/53, 38

[56] References Cited

U.S. PATENT DOCUMENTS

| | | | |
|---|---|---|---|
| 3,370,243 | 2/1968 | Vollmer | 330/305 |
| 3,671,889 | 6/1972 | Favors | 333/177 |
| 3,718,873 | 2/1973 | Garver | 333/164 |
| 3,906,405 | 9/1975 | Kommrusch | 333/17.3 |
| 4,112,394 | 9/1978 | Kershaw | 333/177 |
| 4,197,515 | 4/1980 | Hornfeldt et al. | 333/165 |
| 4,383,228 | 5/1983 | Gaillard | 333/173 |
| 4,571,560 | 2/1986 | Dobrovolny | 333/174 |
| 4,682,131 | 7/1987 | May | 333/219 X |

*Primary Examiner*—Eugene R. Laroche
*Assistant Examiner*—Seung Ham
*Attorney, Agent, or Firm*—John J. Horn; M. Lee Murrah; H. Fredrick Hamann

[57] ABSTRACT

A multicoupler for use in interfacing multiple frequency-agile transceivers to a single antenna. The multicoupler includes a set of high-Q filters and a switching matrix for selectively connecting the transceivers to the filters. The filters have frequency shift capabilities so that a broad frequency range can be covered by a limited number of filter units. The switching matrix is adapted for connecting any one of the transceivers to any one of the filters in accordance with the operative frequencies of the transceivers and filters. The structure of the multicoupler enables it to rapidly track frequency hopping patterns executed by the transceivers while providing good isolation between the transceivers and producing limited amounts of intermodulation distortion.

18 Claims, 3 Drawing Sheets

MULTICOUPLER INCLUDING FREQUENCY SHIFT FILTERS

BACKGROUND OF THE INVENTION

The present invention relates to communication systems and more particularly to multicouplers for interfacing multiple transceivers to a single antenna.

Modern military communications systems require a high level of anti-jam protection which is primarily achieved through spread spectrum techniques such as frequency hopping. In such systems, the frequency of operation of transmitter and corresponding receiver units rapidly change in unison or "hop" from one frequency to another over a broad frequency range such as 30–88 MHz in order to make it more difficult for their transmissions to be jammed. However, this type of frequency agility causes design problems when multiple transceivers are co-located at a single site and must use the same antenna for broadcasting their separate signals. In the past, this problem had been solved by employing multicouplers using slow-tuning mechanical filters which allowed for the required isolation between the transceiver modules. Unfortunately, mechanically tuned filters are simply not fast enough to track the hopping patterns of frequency-agile transceivers. Therefore, a new generation of frequency-agile multicouplers is required which can track frequency hopping patterns while providing the isolation, low insertion loss and high selectivity otherwise required of multicouplers for interfacing two or more transceivers to a single antenna.

It is, therefore, an object of the present invention to provide a multicoupler for interfacing multiple transceivers to a single antenna which is capable of rapidly tracking the hopping patterns of modern frequency-agile transceivers and which comprises a moderately sized structure which may be manufactured at a reasonable cost.

It is another object of the present invention to provide a frequency-agile multicoupler which provides good isolation between the transceivers to which it is connected, low insertion loss for signals passing through the multicoupler and high selectivity for insuring the spectral purity of signals transmitted through the filters of the multicoupler.

It is a further object of the present invention to provide a frequency-agile multicoupler which is constructed and arranged for producing very low levels of intermodulation distortion in the signals passed through the multicoupler.

SUMMARY OF THE INVENTION

The present invention constitutes a frequency-agile multicoupler for interfacing multiple transceivers to a single antenna which can track the hopping patterns of transceivers having frequency hopping capabilities. The multicoupler comprises a set of high-Q bandpass filters having frequency shift capabilities, a switching matrix for selectively connecting particular transceivers to particular filters, a controller for providing control signals adapted for regulating the operations of the switching matrix and filters in response to next hop frequency information from the transceivers and a combining system for coupling the filters to the antenna.

In the preferred embodiment, the frequency shift filters comprise series-connected helical resonators which each include small inductors and capacitors which may be operatively switched in and out of the resonator circuits using PIN diodes. The passbands of the filters defined by the helical resonators may thereby be shifted in accordance with control signals regulating the operation of the PIN diodes so that the filters may each then cover three adjacent frequency bands or slots. The switching matrix includes a set of switching units each having a multiple number of switches comprised of PIN diodes connected both in series and in parallel with the signal paths between the transceivers and the filters. The PIN diodes are switched on and off in accordance with control signals from the controller in order to effectively open and close signal paths between different transceivers and different filters in response to specific control signals. The controller includes digital circuitry adapted for processing next hop signal frequency information from the transceivers and controlling the switches, i.e. the PIN diodes, within the switching matrix and the filters to appropriately channel signals of specific frequencies through filters covering these frequencies. The controller also executes a collision arbitration function for preventing interference between signal paths for separate transceivers.

In operation, one or more of transceivers can be simultaneously operative with each of the transceivers hopping between frequencies at a rapid rate. The switching matrix connects particular transceivers to particular filters so that signals of given frequency may be appropriately channeled between particular transceivers and the antenna through suitable filters. The frequency shift filters provide appropriate frequency slots having passbands covering the frequencies currently being used by the transceivers. Both the switches in the switching matrix and the frequency shift filters are regulated by the controller to respond to the hopping patterns of the operative transceivers. The combining system performs simple impedance matching and low pass filter functions.

DESCRIPTION OF THE PREFERRED EMBODIMENT

Figure 1:
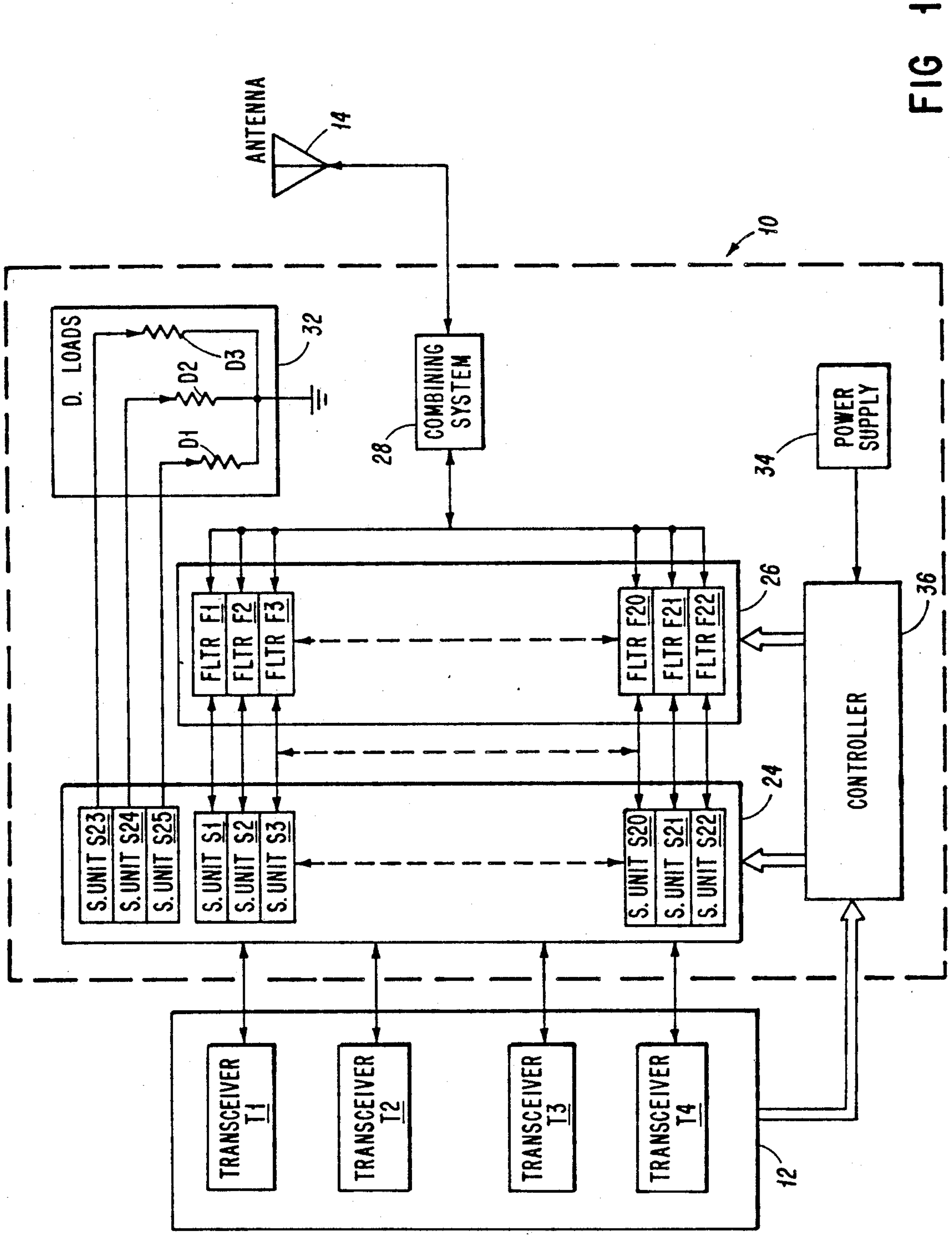
FIG. 1 provides a block diagram of a multicoupler in accordance with the present invention showing the major components and subcomponents of the system as installed between a set of four transceivers and a single antenna.

Referring now to FIG. 1, a multicoupler 10 is shown which enables multiple transceivers within the communications assembly 12 to use a common antenna 14.

Four frequency-agile transceivers T1–T4 are interfaced to the antenna 14 by the multicoupler 10 so as to provide good isolation between the transceivers, low insertion loss and high selectively. At the same time, the multicoupler 10 provides tracking the frequencies of the transceivers through their hopping patterns. The signals traveling between the transceivers T1–T4 the antenna 14 are directed by a switching matrix 24 through a bank 26 of high-Q filters. The filters within the bank 26 are coupled to the antenna 14 by a combining system 28. The controller 36 receives "next hop" radio channel (signal frequency) data from each of the transceivers T1–T4 in the communications assembly 12 which it digitally processes in order to generate signals for controlling the switching units S1–S25 in the switching matrix 24 and for regulating the operation of the filter units F1–F22 in the filter bank 26.

The controller 36 also provides arbitration between the transceivers T1–T4 when they attempt to use radio channels which are located in sufficient proximity to one and another so as to result in interference and controls the switching units S23–S25 to shunt potentially interfering signals to dummy loads D1–D3 in accordance with predetermined priorities. The controller 36 preferably comprises a conventional type state machine employing synchronous combinational logic which can rapidly respond to radio channel and priority information from the communications assembly 12 but may comprise a high speed microprocessor-based system operating under software control. The power supply 34 provides DC output voltages as required for the operation of the control circuits within the controller 36 and for the PIN diode switches within the switching units S1–S25 and the filter units F1–F22, as will be later described. The power supply may comprise of a push-pull center tap buck converter and a single-ended flyback.

Figure 2:
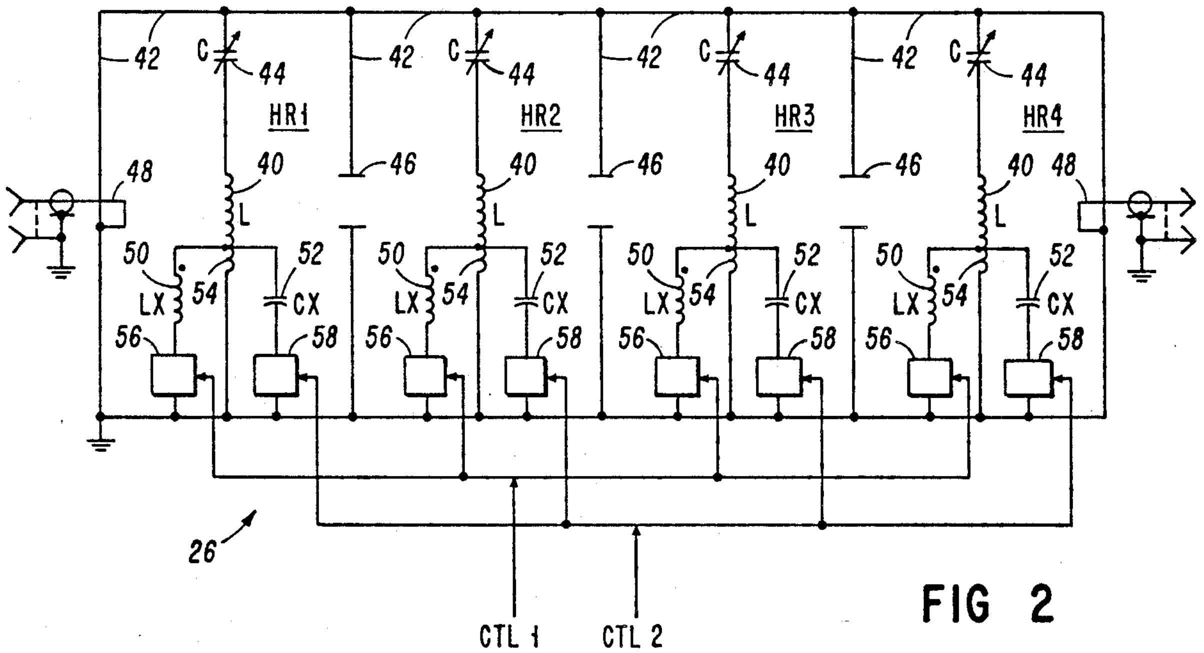
FIG. 2 provides a schematic diagram of a filter unit which is typical of any of the filter units shown in FIG. 1 which comprise the bank of filters connected between the switching matrix and the combining system.

Referring now to FIG. 2, a filter unit 26 is shown which is representative of any of the filter units F1–F22 and includes four series-connected helical resonators HR1–HR4. The resonators HR1–HR4 are identical in their primary operative structures including centrally-positioned coils 40 in the form of helical windings and conductive shield housings 42 which surround the coils 40. The coils 40 are open at their top ends and connected to the shield housings 42, i.e. ground, at their bottom ends. The resonators HR1–HR4 also include small tuning capacitors 44 which may comprise nothing more than screws moving through the top of the shield housings 42 adjacent to the open ends of the coils 40. The resonators HR1–HR4 are interconnected by apertures 46 in the adjoining walls of their shield housings 42 whereby signals maybe passed from one resonator to another by means of the electromagnetic fields generated within the resonators. The filter unit 26 is connected to its corresponding switching unit in the switching matrix 24 and to the combining system 28 through the action of inductive loops 48 which maybe wound adjacent to the bottom ends of the coils 40 of the end resonators HR1 and HR4.

The filter 26 is specially adapted to be able to rapidly shift frequencies in accordance with a pair of control signals CTL1 and CTL2 from the controller 36. To this end, the helical resonators HR1–HR4 contain additional inductors 50 and additional capacitors 52 which are tapped into the coils 40 toward their shield-connected ends 54. The inductors 50 and capacitors 52 are operatively controlled by the switching elements 56 and 58 connected between the inductors 50 and capacitors 52 and the shield housing 42 (i.e. ground). The control signals CLT1 and CLT2 separately control the operations of the switching elements 56 and 58, respectively, in order that either the inductors 50 or the capacitors 52 may all be switched into the resonant circuits formed by the helical resonators HR1–HR4 and the resonant frequencies of all of the resonators HR1–HR4 in each individual filter unit maybe similarly shifted in response to the control signals.

Figure 4:
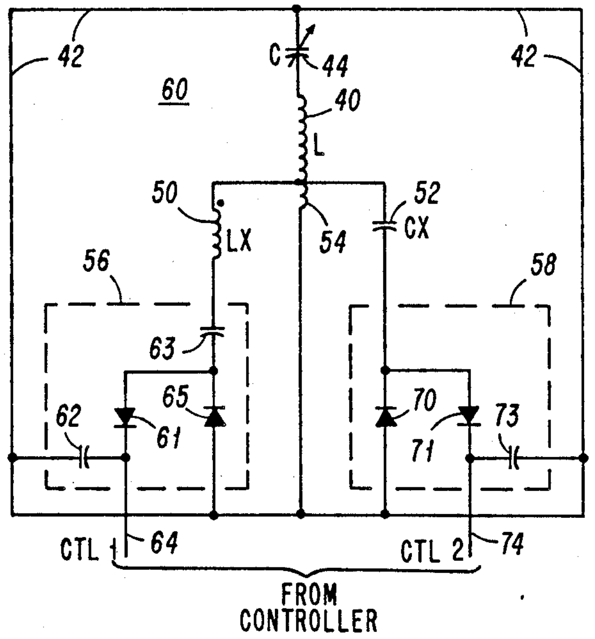
FIG. 4 provides a schematic diagram of a helical resonator typical of any of the helical resonators shown in FIG. 2 in which the switching elements included within the resonators are shown in greater detail.

Referrng now to FIG. 4, a helical resonator 60 is shown which is representative of any of the helical resonators (such as resonators HR1–HR4) within any of the filter units F1–F22 and includes as its primary operative components the coil 40, the shield housing 42, the tuning capacitor 44, the inductor 50, the capacitor 52 and the switching elements 56 and 58, as previously referenced. The coil 40 electrically interacts with the shield housing 42 to provide a high-Q resonant circuit useful as a filter component. The dimensions of the helical winding of the coil 40 and the shield housing 42 are carefully determined to select the desired resonant frequency of the helical resonator 60. All of the resonators, such as the resonators HR1–HR4 shown in FIG. 2, within each of the individual filter units F1–F22 are constructed to have the same resonant frequency. However, the resonators within the different filter units F1–F22 in the bank 26 are constructed to have different resonant frequencies covering the entire frequency range of operation of the transceivers T1–T4. Referring back to FIG. 4, the inductor 50 and capacitor 52 are tapped into the coil 40 towards its shield-connected end 54 and effectively add small amounts of additional inductance or capacitance to the resonator circuit when operatively switched into the circuit by one or the other of the switching elements 56 or 58. The resonant frequency of the helical resonator 60 may thereby be controllably varied. The resonant frequencies of all of the helical resonators within each of the individual filter units F1–F22 are simultaneously shifted. Each of the filter units F1–F22 is thereby enabled to provide filtering action over three separate but adjacent frequency bands or slots which in turn allows the bank 26 of filter units to provide filtering action over sixty-six separate filter slots in accordance with control signals from the controller 36.

Referring now again to FIG. 4, the switching elements 56 and 58 are connected between the inductor 50 and capacitor 52 and the shield housing 42 so as to allow the switching elements 56 and 58 to insert or remove the inductor 50 or the capacitor 52 from the operative circuitry of the helical resonator 60 in response to first and second control signals CTL1 and CTL2 from the controller 36. The switching element 56 includes two PIN diodes 65 and 61 and two capacitors 62 and 63. The PIN diode 65 is connected between the inductor 50 and ground, i.e. shield housing 42, so as to provide a low impedance path between the inductor 50 and ground when the diode is forward biased. The PIN diode 61 is installed along the control line 64 intersecting the lead connecting the inductor 50 and PIN diode 65 so as to be able to apply a control voltage for biasing of the PIN diode 65. The blocking capacitor 63 stops DC control voltages on the line 64 from passing up through the inductor 50 while the bypass capacitor 62 shunts RF energy proceeding past the PIN diode 61 to ground so that it can not affect the controller 30. The switching element 58 includes the PIN diodes 70 and 71 and the capacitor 73. The PIN diode 70 is connected between the capacitor 52 and ground, i.e. shield housing 42, so as to provide a low impedance path between the capacitor 52 and ground when the diode is forward biased. The PIN diode 71 is installed along the control line 74 which intersects the lead connecting the capacitor 52 and PIN diode 70 so as to be able to apply a control voltage for biasing the PIN diode 71. The bypass capacitor 73 shunts RF energy preceding past the diode 71 to ground so that it cannot effect the controller 30.

In its role as a filter device, the resonant frequency of the helical resonator 60 and the passband of the resonator 60 are responsive to the control signals CTL1 and CTL2. When both of the control signals CTL1 and CTL2 are positive, the resonant frequency and a passband of the resonator 60 are determined solely by the coil 40, capacitor 44 and shield housing 42 and therefore the resonator 60 resonates at a "center" frequency and passes signals having frequencies within a "central" band. However, when the control signals CTL1 is negative (and the control signal CTL2 is positive), the inductor 50 is switched to ground and the center frequency and passband of the resonator 60 are shifted up in frequency in accordance with the value of the inductance 50, which is preferably selected to provide a passband adjacent to the central passband of the resonator 60. When the control signal CTL2 is negative (and the control signal CTL1 is positive), the capacitor 52 is switched to ground and the center frequency and passband of the resonator 60 are shifted down in frequency by an amount determined by the value of the capacitor 52, which is preferably selected to provide a passband adjacent to the central passband of the resonator 60. It should be noted that the values of the inductor 50 and capacitor 52 for each helical resonator within each of the filters F1–F22 are individually selected along with the dimensions of the coil 40 and shield housing 42 in view of the frequency band to be covered in total by the bank 26 and in view of the selectivity provided by series-connected helical resonators in order to provide adjacent contiguous frequency passbands or slots across the entire range of frequencies over which the transceivers T1–T4 may operate.

Frequency shift filters F1–F22 of the type illustrated and described provide low distortion performance since only a small portion of the operative voltages to which the resonators (HR1–HR4), are subject is applied to the switching elements 56 and 58 due to the fact that the switching elements are tapped into the coils 40 toward there shield-connected ends. Consequently, the characteristic non-linearities of switching elements (i.e. the PIN diodes) affect the output voltages from the filters to a proportionately lesser degree in accordance with the limited dynamic range of the signals actually applied to the diodes. The amount of intermodulation distortion produced by the multicoupler 10 is therefore greatly limited.

Figure 3:
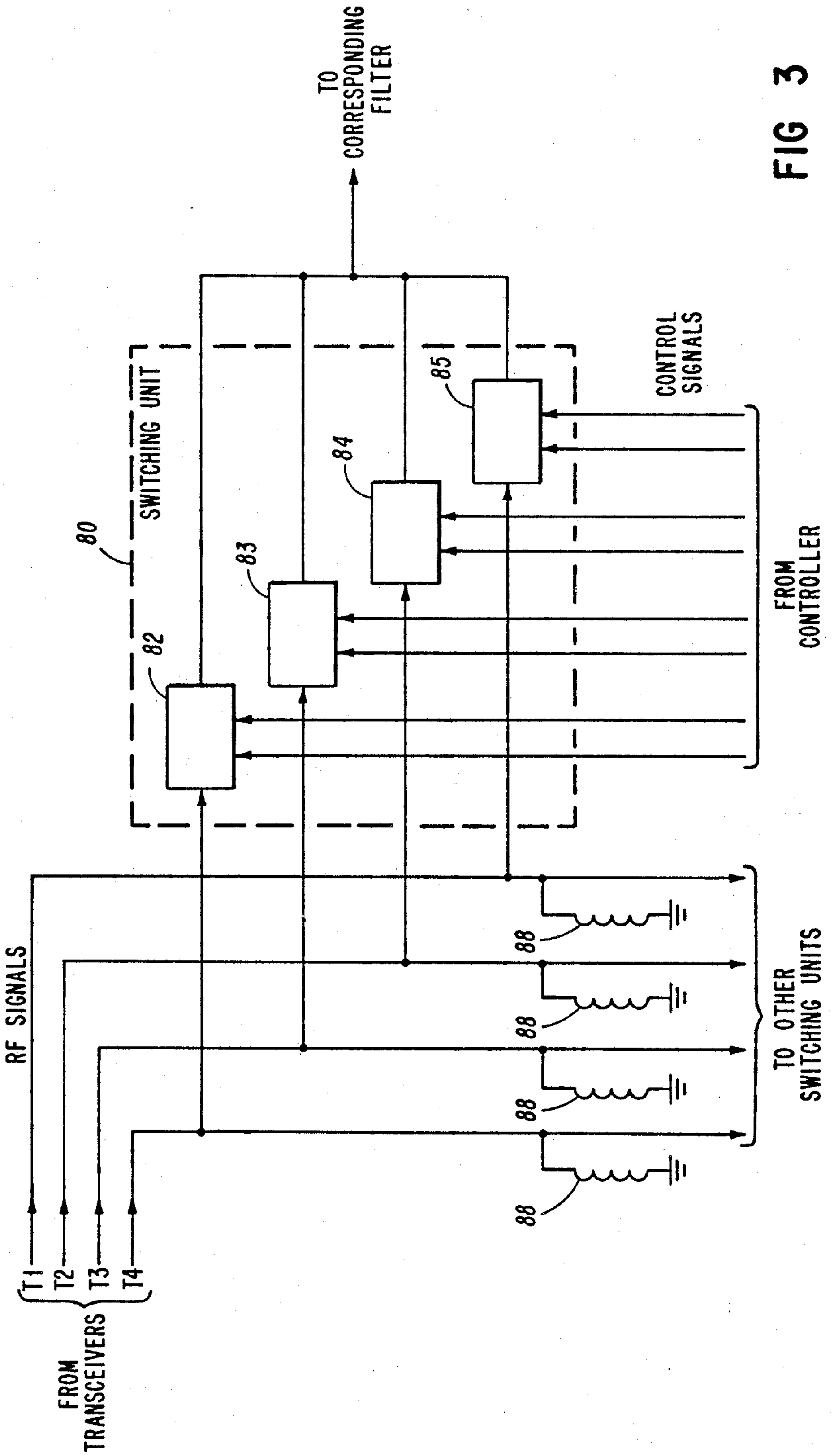
FIG. 3 provides a block diagram of a switching unit typical of any of the switching units shown in FIG. 1 which comprise the switching matrix connected between the transceivers and the bank of filters.

Referring now to FIG. 3, a switching unit 80 is shown which is representative of any of the switching units S1–S23 and includes four switches 82, 83, 84 and 85. Each one of the switches 82, 83, 84 and 85 is connected to an output line from a different transceiver; the switch 82 is connected to the transceiver T4, the switch 83 is connected to the transceiver T3, the switch 84 is connected to the transceiver T2 and the switch 85 is connected to the transceiver T1. The outputs of all of the switches 82, 83, 84 and 85 are connected to a common output line leading to a single one of the filters F1–F22. Each one of the switches 82, 83, 84, and 85 is connected to a pair of control lines coming from the controller 36 over which controls signals are provided which regulate the operation of the switches 82, 83, 84, and 85 for connecting one (or more) of the transceivers T1–T4 to the specific filter unit to which the particular switching unit 80 is connected. The coils 88 are connected along the input lines to the switches 82, 83, 84 and 85 (which connect up with all of the switching units S1–S25) and are operative for shunting DC control current to ground as will be later explained.

Figure 5:
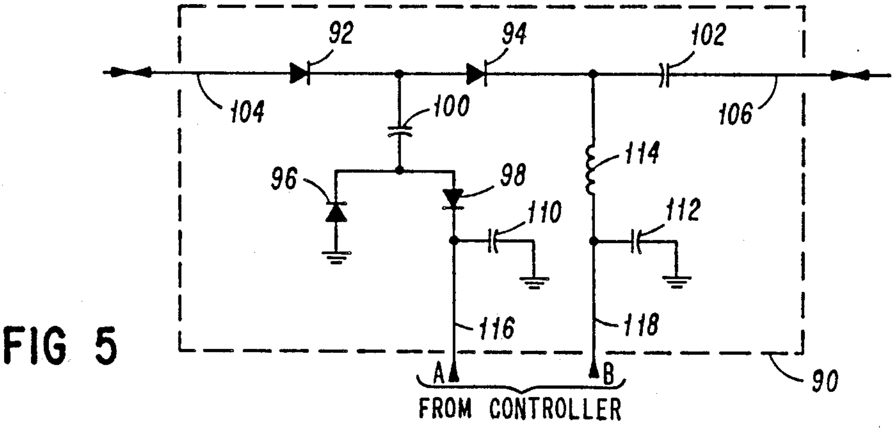
FIG. 5 provides a schematic diagram of a switch which is typical of any of the switches shown in FIG. 3 in which the circuitry of the switches is shown in greater detail.

Referring now to FIG. 5, a switch 90 is shown which is representative of any of the switches (such as switches 82, 83, 84 and 85) within any of the switching units S1–S25 and includes as its primary operative components the PIN diodes 92, 94, 96 and 98 which are operative in response to the control signals A and B for switching RF signals through the switch 90 or blocking such signals and electrically isolating the transceiver associated with the switch from the filter associated with the switch. When the control signal A is positive and the control signal B is negative, the diodes 96 and 98 are reversed biased to prevent the flow of RF signal energy through the capacitor 100 to ground, while the diodes 92 and 94 are forward biased to allow the flow of RF signal energy between the port 104 connected to the transceiver associated with the switch 90 and the port 106 connected to the filter associated with the switch 90. When the control signal A is negative and the control signal B is positive, the diodes 92 and 94 are reversed bias so as to block the flow of RF signal energy between the port 104 connected to the transceiver associated with the switch 90 and the port 106 connected to the filter associated with a switch 90, while the diodes 96 and 98 are forward biased so that any RF signal energy passing by one of the diodes 92 or 94 may be shunted to ground through the capacitor 100 the diode 96. The capacitors 110 and 112 and the choke 114 are all operative to prevent RF energy from passing down the control lines 116 and 118 to the controller 30. The coils 88 of FIG. 3 provide a path for the flow of DC control current to ground through the diodes 92 and 94 while blocking the flow of RF energy. The switch 90 provides a low VSWR path between the transceiver with which it is associated and the filter with which it is associated. This path is further characterized by a very low insertion loss but a high degree of isolation due to the use of two diodes 92 and 94 in series as well as two diodes 96 and 98 in a shunt relationship to ground.

The combining system 28 comprises a transformer/impedance matching network and a roofing filter. The impedance matching network includes a lumped element bandpass filter suitable for absorbing the off-channel reactance of the lines leading to the inactive filter units and for providing an appropriate load impedance transformation. The transformer/impedance matching network might, for example, comprise a five element Tchebyshev filter having resistive elements selected to provide a proper common junction load resistance. The roofing filter comprises a low pass filter designed to suppress signals corresponding to the recurrent modes of the helical resonators in the filter units F1–F22 which occur at approximately three times the resonant frequencies of the resonators. The roofing filter might comprise a nine branch elliptic function filter having a cut off slightly above the frequency range of the transceivers T1–T4 providing a minimum of 85dB of attenuation above this cut off point.

Reviewing the overall operation of the multicoupler 10 of the present invention, the multicoupler 10 interfaces four separate transceivers T1–T4 to a single antenna 14 by switching the signal paths from the transceivers to the antenna 14 through twenty-two separate frequency shift filters using specially constructed PIN diode switches for achieving good isolation between the transceivers. The frequency shift filters F1–F22 are each capable of operating over adjacent passbands defining three adjacent but separate frequency slots. The frequencies slots of each of the filters F1–F22 are arranged to be "contiguous" so that the filters F1–F22 completely cover an entire frequency range, e.g. 30–88 MHz, dividing this range into sixty-six separate frequency slots. In response to next hop frequency information provided by the transceivers T1–T4, the controller 36 regulates the operation of the switching units S1–S22 to provide signal paths through appropriate filters F1–F22 between each of the transceivers T1–T4 which may be operative and the antenna 14. The controller 36 also regulates the frequency shift filters F1–F22 to shift their frequencies when necessary to appropriate frequencies matching the frequencies of the transceivers to which the individual filters are connected. Additionally, the controller 36 performs collision arbitration between the transceivers T1–T4 in order to avoid interference due to transmitter operations taking place in a filter slot less than three slots from any other transceiver, receiver operations in a filter slot less than three slots from any transmitter operation and different receiver operations requiring different slots in a single common filter. When collisions involving transmitter operations occur, one or more transceivers T1–T4 are switched through the switching unit S23–S25 to the dummy loads D1–D3 of the load module 32 in accordance with priority instructions which may be detailed to the controller 36 by the system operator through mode switches or equivalent input mechanisms.

The frequency shift filters F1–F22 each contain a plurality of helical resonators having special designs which allow for frequency shifting in order to allow the filters F1–F22 to cover three adjacent frequency slots. Such frequency shifting is enabled by PIN diodes switches which allow separate inductive and capacitive elements to be switched in and out of each helical resonator circuits. The PIN diode switches and the inductive and capacitive elements are tapped into the central coil of each helical resonator at a point substantially toward its shield connected or grounded end so that the PIN diodes are subject to only a limited portion of the total dynamic range of the signals passing through the filters F1–F22 in order to thereby limit the distortion arising from the effects of the non-linear characteristics of the PIN diodes.

The switching units S1–S25 comprising the switching matrix 24 each include four separate switches which also use PIN diodes. Within each switch separate PIN diodes are used in series and in shunt with the signal path as to achieve good isolation between the transceivers and their signals.

While the present invention does require a substantial number of separate filters, e.g. 22 filters, these filters allow the frequency range to be covered in sixty-six separate frequency slots which is generally sufficient for avoiding an undo number of collisions between the separate transceivers during simultaneous operations. The present invention provides a high performance multicoupling capability for tracking and filtering signals from multiple transceivers which are hopping in frequency at a rapid rate which heretofor has not been possible with circuitry of reasonable size and complexity.

While particular embodiments of the present invention have been shown and described, it should be clear that changes and modifications may be made to such embodiments without departing from the true scope and spirit of the invention. For example, embodiments can be readily envisioned in which multiple transceivers are interfaced to more than one antenna using more than one bank of filters in order to reduce the number of "collisions" between transceiver signals. It is intended that the appended claims cover all such changes and modifications.

We claim:

1. A multicoupler for interfacing a plurality of frequency-agile transceivers to a single antenna, comprising:

a plurality of frequency shift filter units each including a plurality of series-connected helical resonators each having a helical winding and one or more reactive elements tapped into said winding toward its shield connected end through switching elements controllable for shifting the bandpass characteristics of the filter units;

a switching matrix for directing the flow of signals between said transceivers and said filter units so that particular transceivers may be selectively connected to specific filter units in accordance with a set of control signals;

control means for generating control signals adapted for regulating the operation of said switching matrix and controlling the operation of said switching elements in response to signal frequency information provided by said transceivers in order to direct particular RF signals through particular filters passing particular frequency bands while avoiding interference arising from collisions between signal paths between different transceivers and said antenna; and means for coupling said filter units to said antenna.

2. The multicoupler of claim 1, wherein said reactive elements for each resonator include: a capacitor and an inductor and said switching elements include PIN diodes operationally controlled in accordance with said control signals from said control means.

3. The multicoupler of claim 1, wherein said means for coupling said filter units to said antenna includes an impedance matching network and a roofing filter.

4. The multicoupler of claim 2, wherein said capacitor and inductor have values selected to shift the operational frequency of the filter unit with which they are associated for passing signals in adjacent but separate frequency slots.

5. The multicoupler of claim 1, wherein said switching elements each include:

a first PIN diode for connecting the reactive element with which it is associated to ground and a second PIN diode for coupling said first PIN diode to said control means and enabling a control signal to be applied to the switching element.

6. In a multicoupler adapted for interfacing a plurality of frequency-agile transceivers to one or more antennas and including a plurality of filter units comprising series-connected helical resonators having helical windings disposed within shield housings, a switching matrix for selectively directing signals from particular transceivers to specific filter units, and a controller for regulating the operation of said switching matrix in response to signal frequency information from said transceivers, the improvement comprising:

a plurality of branch circuits including a PIN diode and a reactive element, one or more of which are associated with each resonator and which are tapped into said helical windings at points toward their shield-connected ends; and control means associated with said controller and coupled to said PIN diodes for regulating the operation of said diodes in coordination with said switching matrix in order to shift the frequency bands of said filter units in response to signal frequency information from said transceivers.

7. The improvement of claim 6, wherein a pair of branch circuits is associated with each resonator and the reactive elements within said pair of branch circuits comprise an inductive element and a capacitive element.

8. The improvement of claim 7, wherein said inductive element and said capacitive element have values selected to shift the operational frequency of the filter unit with which they are associated for passing signals in adjacent but separate frequency bands.

9. A helical resonator circuit for use in a frequency shift filter unit characterized by low levels of intermodulation distortion, a helical winding;

a helical winding;

a shield housing surrounding said helical winding and connected to one end of said winding; and a branch circuit tapped into said winding at a point toward its shield housing connected end and including:

a reactive element; and a first PIN diode for controlling current flow through said reactive element.

10. The resonator of claim 9, further including a tuning capacitor attached to said shield housing.

11. The resonator of claim 9, further including a second PIN diode coupled to said first PIN diode and adapted for enabling a control signal to be applied to said first PIN diode.

12. A helical resonator circuit for use in a frequency shift filter unit characterized by low levels of intermodulation distortion, a helical winding;

a helical winding;

a shield housing surrounding said helical winding and connected to one end of said winding;

an inductive element tapped into said winding toward its shield-connected end;

a capacitive element tapped into said winding toward its shield-connected end;

a first PIN diode connected for controlling current flow through said inductive element; and a second PIN diode connected for controlling current flow through said capacitive element.

13. The resonator of claim 12 further including third and fourth PIN diodes coupled to said first and second PIN diodes and adapted for enabling control signals to be applied to said first and second PIN diodes.

14. The resonator of claim 12, further including a tuning capacitor attached to said shield housing.

15. A frequency shift filter unit comprising a plurality of series-connected helical resonators, said helical resonators including:

a helical winding;

a shield housing surrounding said helical winding and connected to one end of said winding;

a first reactive element tapped into said winding toward its shield-connected end; and a first PIN diode connected to and adapted for controlling current flow through said first reactive element.

16. The frequency shift filter unit of claim 15 wherein said reactive element is inductive.

17. The frequency shift filter of claim 15, wherein said reactive element is capacitive.

18. The frequency shift filter unit of claim 15, further including:

a second reactive element tapped into said winding toward its shield connected end; and a second PIN diode connected to and adapted for controlling current flow through said second reactive element.

* * * * *